(12) United States Patent
Ballard et al.

(10) Patent No.: US 7,080,245 B2
(45) Date of Patent: Jul. 18, 2006

(54) METHOD AND SYSTEM OF SWITCHING BETWEEN TWO OR MORE IMAGES OF FIRMWARE ON A HOST DEVICE

(75) Inventors: Curtis C. Ballard, Eaton, CO (US); Bill Torrey, Greeley, CO (US); Colette Howe, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 551 days.

(21) Appl. No.: 10/155,345

(22) Filed: May 23, 2002

(65) Prior Publication Data

US 2003/0221092 A1 Nov. 27, 2003

(51) Int. Cl.
*G06F 9/445* (2006.01)
*G06F 15/177* (2006.01)

(52) U.S. Cl. .......................................... 713/2; 709/222
(58) Field of Classification Search .................... 713/1, 713/2, 100; 709/222
See application file for complete search history.

(56) References Cited

U.S. PATENT DOCUMENTS

| | | | |
|---|---|---|---|
| 5,274,816 A * | 12/1993 | Oka | 713/2 |
| 5,388,267 A * | 2/1995 | Chan et al. | 713/2 |
| 5,454,110 A * | 9/1995 | Kannan et al. | 713/2 |
| 6,115,813 A * | 9/2000 | Hobson et al. | 713/1 |
| 6,175,917 B1 | 1/2001 | Arrow et al. | |
| 6,430,663 B1 * | 8/2002 | Ding | 711/162 |
| 6,446,203 B1 * | 9/2002 | Aguilar et al. | 713/2 |
| 6,473,857 B1 * | 10/2002 | Panas et al. | 713/2 |
| 6,513,113 B1 * | 1/2003 | Kobayashi | 713/2 |
| 6,691,160 B1 * | 2/2004 | Bradley | 709/222 |
| 6,754,818 B1 * | 6/2004 | Lee et al. | 713/2 |

FOREIGN PATENT DOCUMENTS

| | | |
|---|---|---|
| EP | 0939367 A2 | 9/1999 |
| WO | WO 01/61485 | 8/2001 |

OTHER PUBLICATIONS

"Multi-Firmware", source code indicates Dec. 2001, at http://www.cs.helsinki.fi/u/jikorhon/condev/gp32/multifw.html.
"Firmware Flashing on the GP32", Apr. 30, 2003, Guyfawkes, at http://207.44.176.77/admin28/gp32emu/faq/firmware.htm.
"SUMMARY:Booting from Toshiba 3401", Jun. 4, 1993, at http://www.sunmanagers.org/archives/1993/0954.html.

* cited by examiner

*Primary Examiner*—Thuan Du (57) ABSTRACT

A method of switching between two or more images of firmware on a host device includes storing two or more images of firmware in non-volatile memory of the host device and loading one of the images upon startup in response to a user-controllable indicator. A host device that runs firmware during operation may include a non-volatile memory unit that stores a boot code module and is configured to hold two or more firmware images, a processor for executing the boot code module and firmware, said processor being in communication with the non-volatile memory and a switch in communication with the processor, where the boot code module is configured to cause the processor to execute a particular firmware image in response to a position of the switch. Alternatively, a host device that runs firmware during operation may include a non-volatile memory unit that stores a boot code module and at least one firmware image, a processor for executing firmware that communicates with the non-volatile memory unit and a digital flag associated with each firmware image in the non-volatile memory unit, where the boot code module is configured to execute a particular firmware image in response to the digital flags.

14 Claims, 5 Drawing Sheets

METHOD AND SYSTEM OF SWITCHING BETWEEN TWO OR MORE IMAGES OF FIRMWARE ON A HOST DEVICE

FIELD OF THE INVENTION

The present invention relates to the field of firmware that is stored in and controls the operation of a host device. More particularly, the present invention relates to the field of switching between two or more images of firmware on a host device.

BACKGROUND OF THE INVENTION

Firmware is the computer code or software that is stored in an electronic device to control the operation of that device. Many electronic devices operate using a piece of firmware, e.g., wireless phones, set-top boxes, digital music players, etc. The device on which the firmware is stored and executed is frequently referred to as the host or the host device.

The firmware is typically stored in a non-volatile memory unit of the host device, for example, a flash memory unit. A non-volatile memory unit retains data even when power to the memory unit is discontinued. Consequently, the firmware is available when the host is activated.

When the device is started, the firmware is typically loaded into volatile memory, e.g., Random Access Memory (RAM), and executed by the processor of the host device. The processor's execution of the firmware causes the device to operate and provide the function or functions for which the host device was intended. In addition to providing the device's functionality, the firmware may also include a user interface allowing the user to control the functioning of the host device.

Frequently, it becomes necessary or desirable to change or upgrade the firmware in a host device. For example, a new firmware version may operate more robustly than an earlier version. A new firmware version may also provide additional features or extend the functionality of the host device.

Unfortunately, as with all software development, introducing a new version of firmware may cause unanticipated problems in the host device. Moreover, any particular host device may have a particular configuration of peripherals and additional applications or software that run on that host. Thus, the operating conditions on each host may be slightly different even if the host devices are identical. Consequently, a new firmware version may encounter problems on one host device that are not encountered on another host device.

When firmware is upgraded the typical upgrade procedure is as follows. The new firmware image is downloaded to the host device. The previous firmware image is deleted prior to downloading the new version or is overwritten by the new firmware image being downloaded.

The device is then restarted with the new firmware image being automatically loaded and executed as a consequence of the device being restarted. Hopefully, the host device will function as expected, perhaps with additional or enhanced functionality, while running the new firmware image.

If any problems are encountered, it will be necessary to determine if the difficultly has been caused by the new firmware or has some other cause. In order to diagnose this, or simply to return the device to operation, it may be necessary to reinstall the previous firmware version. This typically entails downloading the old firmware image to the host device. As before, the new firmware image is deleted prior to downloading the old version or is overwritten by the old firmware image being downloaded. The device is then restarted using the old firmware to see what impact this may have on the problems encountered with the new firmware version.

As can be appreciated by those skilled in this art, in order to troubleshoot and correct the problems with the new firmware, it may be necessary to switch between the old and new firmware versions several times and observe the resulting effect on the host device. This process is made extremely tedious by the need to download and install the desired firmware version each time a switch between versions is needed.

SUMMARY OF THE INVENTION

In one preferred embodiment, the present invention provides a method of switching between two or more images of firmware on a host device by storing two or more images of firmware in non-volatile memory of the host device and loading one of the images upon startup in response to a user-controllable indicator.

In another preferred embodiment, the present invention provides a host device that runs firmware during operation, the host device comprising a non-volatile memory unit that stores a boot code module and is configured to hold two or more firmware images, a processor for executing the boot code module and firmware, the processor being in communication with the non-volatile memory, and a switch in communication with the processor, where the boot code module is configured to cause the processor to execute a particular firmware image in response to a position of the switch.

In still another preferred embodiment, the present invention provides a host device that runs firmware during operation, the host device comprising a non-volatile memory unit that stores a boot code module and at least one firmware image, a processor for executing firmware that communicates with the non-volatile memory unit and a digital flag associated with each firmware image in the non-volatile memory unit, where the boot code module is configured to execute a particular firmware image in response to the digital flags.

BRIEF DESCRIPTION OF THE DRAWINGS

The accompanying drawings illustrate preferred embodiments of the present invention and are a part of the specification. Together with the following description, the drawings demonstrate and explain the principles of the present invention. The illustrated embodiment are examples of the present invention and do not limit the scope of the invention.

Throughout the drawings, identical reference numbers designate identical elements.

DETAILED DESCRIPTION OF THE PREFERRED EMBODIMENTS

The present invention provides a means and method of readily switching between two firmware images in a host device so that, for example, trouble-shooting a new firmware version can be easily and quickly performed. Two firmware images, for example, an old image and a new image, are both stored in the memory of the host device. In one embodiment, a physical switch informs the boot code which firmware image to load. Thus, by toggling the switch, the user can rapidly switch between the two firmware images. In another embodiment, electronic flags are used to inform the boot code which firmware image to load, thereby enabling ready switching between the two firmware images.

Figure 1:
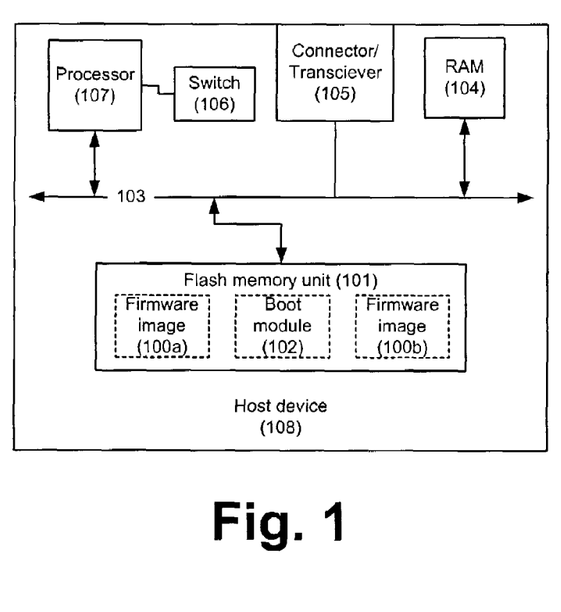
FIG. 1 is a block diagram of an exemplary embodiment of a host device with available switching between two firmware images according to the principles of the present invention.

FIG. 1 is a block diagram of an exemplary embodiment of a host device, according to principles of the present invention, with available switching between two firmware images. As shown in FIG. 1, the host device (108) includes a non-volatile memory unit, e.g., a flash memory unit (101). This non-volatile memory unit (101), preferably a flash memory unit, may be a single non-volatile memory device or may be a plurality of non-volatile memory devices.

The memory unit (101) may contain two or more firmware images. In FIG. 1, two firmware images (100a, 100b) are illustrated. If the memory unit (101) consists of two or more memory devices, each firmware image (100a, 100b) may be stored in a different memory device. However, the two firmware images (100a, 100b) can also be stored at different locations within a single memory device, preferably a flash memory unit. A boot code module (102) is also stored in the non-volatile memory unit (101) and will be explained in detail below.

The host device (108) also preferably has a processor (107) and Random Access Memory (RAM) (104). Typically, the processor (107) loads firmware from non-volatile memory (101) into the RAM (104) and then executes the firmware. However, it is possible that the processor (107) could run firmware directly from the non-volatile memory unit without first copying the firmware to volatile memory, i.e., RAM (104).

Preferably, the processor (107), the RAM (104) (if used) and the non-volatile memory unit (101) are all interconnected by a data bus (103). The data bus (103) allows data to be transmitted among the various components of the host device (108).

A connector or transceiver (105) is a channel through which data, such as a new firmware image, can be downloaded to the host device (108). The connector/transceiver (105) also connects to the bus (103) and can, therefore, provide data to the various components of the host device (108) that are connected to the bus (103).

If the connector/transceiver (105) is a connector, it can be used to connect the host device (108) to a network or another device such as a computer that can provide data to the host device (108). For example, the connector (105) can be a connection to the Internet, a Local Area Network (LAN) or a Wide Area Network (WAN). Alternatively, the connector can be used to connect the host device (108) to a computer, server, disc drive or other device that provides data, such as a firmware image, to the host device (108). The connector (105) may be, for example, a serial connection, a Universal Serial Bus (USB) connection, Institute of Electrical and Electronics Engineers (IEEE) 1394 connection, etc.

If the connector/transceiver (105) is a transceiver, the transceiver can be used, for example, to wirelessly receive data in the host device (108). The transceiver (105) may be an optical, infrared, radio frequency or other type of transceiver. Any means of downloading data, e.g., a firmware image, into the host device (108) can be used within the principles of the present invention.

When the host device (108) is initially powered up, the processor (107) will automatically load the boot code module (102) from flash memory (101) into RAM (104) and execute the boot code (102) from RAM, or the processor (107) may execute the boot code module (102) directly from flash memory (101). The boot code (102) provides the initial instructions that allow the host device (108) to begin operating, including instructions for loading and executing available firmware. Thus, it is the boot code (102) that oversees the loading of the firmware from flash memory (101) into RAM (104).

In the host device (108) of the present invention, two or more firmware images (e.g., 100a, 100b) may be provided. One image (100a) may be an older image, while the other image (100b) is an updated, newer firmware image. Only one of the two firmware images (100a, 100b) will be loaded and executed by the boot code (102) when the host device is started. The other firmware image will remain unused in non-volatile memory.

The boot code module (102) determines which of the two firmware images (100a, 100b) should be loaded into RAM (104) and executed by the processor (107) when the host device (108) is started. For this purpose, under principles of the present invention, a switch (106) may be provided and connected to the processor (107). The switch (106) may be, for example, a physical, bipolar switch that moves between first and second positions. One of the positions, e.g., the first position, will be considered a default position.

When the boot code (102) is running on the processor (107) and must determine which firmware image (100a, 100b) to load into RAM (104), the boot code (102) queries the position of the switch (106). The switch may be configured to send a "1" or "0" to the processor indicative of its position. If the switch (106) is in the default position, the boot code (102) will preferably identify the newest firmware image (100a) and load that image to RAM (104). It is presumed that the newest available firmware image should be the image loaded.

Each firmware image (100) may have a version number appended in the header or the file name that the boot code (102) can read to identify which image is the latest image. Alternatively, the memory unit (101) may record when or in what order firmware images have been received so that the latest firmware image can be identified to the boot code (102).

If, however, the switch (106) is in a second position, not the default position, the boot code (102) will load the older firmware image (100b) as identified by version number, download date or order, etc. Consequently, by toggling the switch (106), a user or technician can rapidly switch the version of firmware (100) loaded and executed by the host device (108).

Each time the position of the switch (106) is changed and the host device (108) restarted, the boot code (102) will load a different firmware image (100a, 100b) associated with the position of the switch (106). In, for example, a troubleshooting operation, a technician can rapidly switch between two firmware images and observe the behavior of the host device (108) as it differs depending on the firmware image used.

For easiest access, the switch (106) may be accessible through an exterior housing of the host device (108). Alternatively, the switch (106) may require removal of the host device housing for access.

As will be appreciated by those skilled in the art, the present invention can also encompass an embodiment in which three or more firmware images are stored in the host device. The switch may then have three or more positions, each of which corresponds to a particular image of firmware that will be loaded if the host device is booted with the switch in that position.

Figure 2:
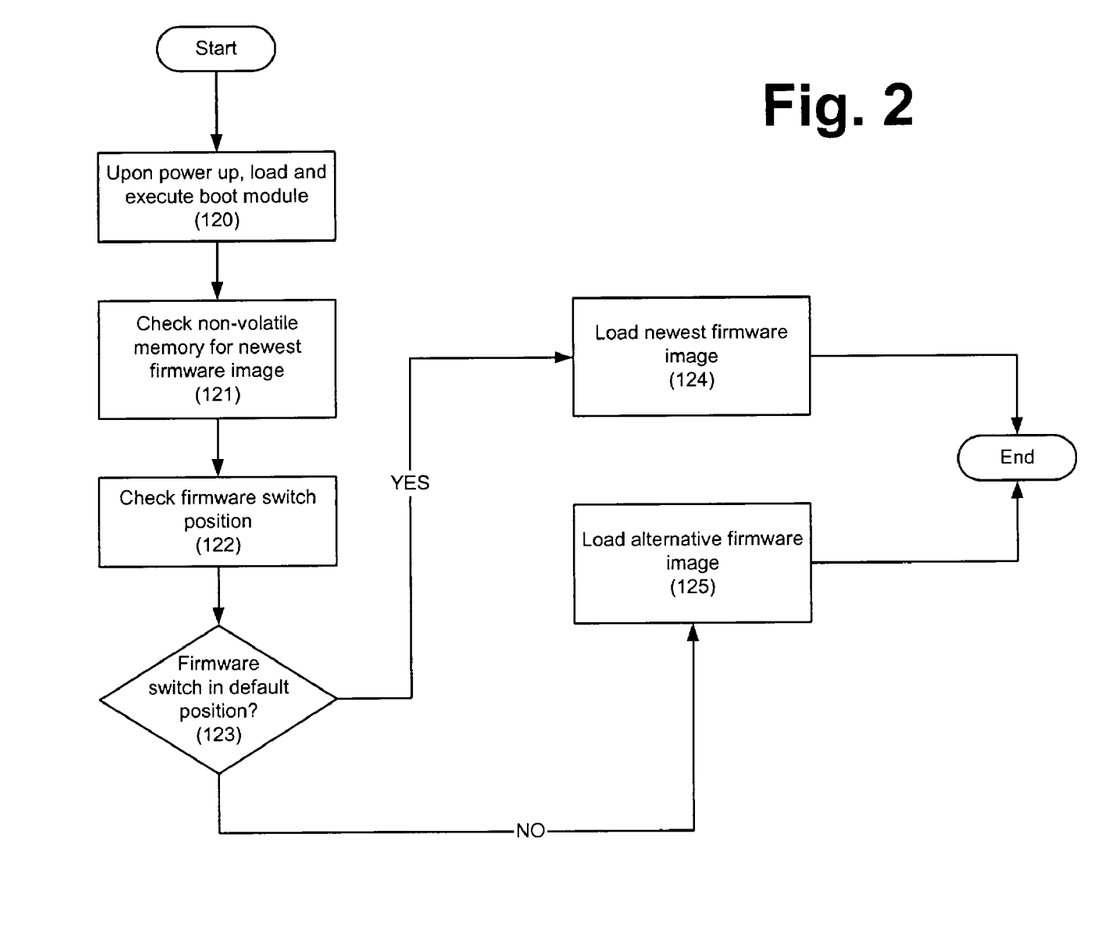
FIG. 2 is a flowchart illustrating an embodiment of a method of switching between alternative firmware images according to the principles of the present invention that is implemented, for example, in the device of FIG. 1.

FIG. 2 is a flowchart illustrating a method of switching between alternative firmware images according to principles of the present invention. The method illustrated in FIG. 2 can be implemented, for example, in the device of FIG. 1. As shown in FIG. 2, the method begins when the host device is powered up or activated. The boot code module is then loaded and executed. (step 120).

The boot code module may then check the non-volatile memory to identify the various firmware images in the memory unit. The boot code may also, at this point, determine which of the firmware images is the newest. (step 121).

The boot code module then checks the firmware switch to determine its position (step 122), e.g., is the switch in the default position (decision 123). If the switch is in the default position, the newest firmware image in memory is loaded and executed. (step 124). If the switch is not in the default position, the older or alternative firmware image is loaded. (step 125). As will be appreciated by those skilled in the art, the steps in this method may be performed in a different order. For example, the boot code could, alternatively, query the position of the switch before identifying the relative ages of the firmware images in memory.

Figure 3:
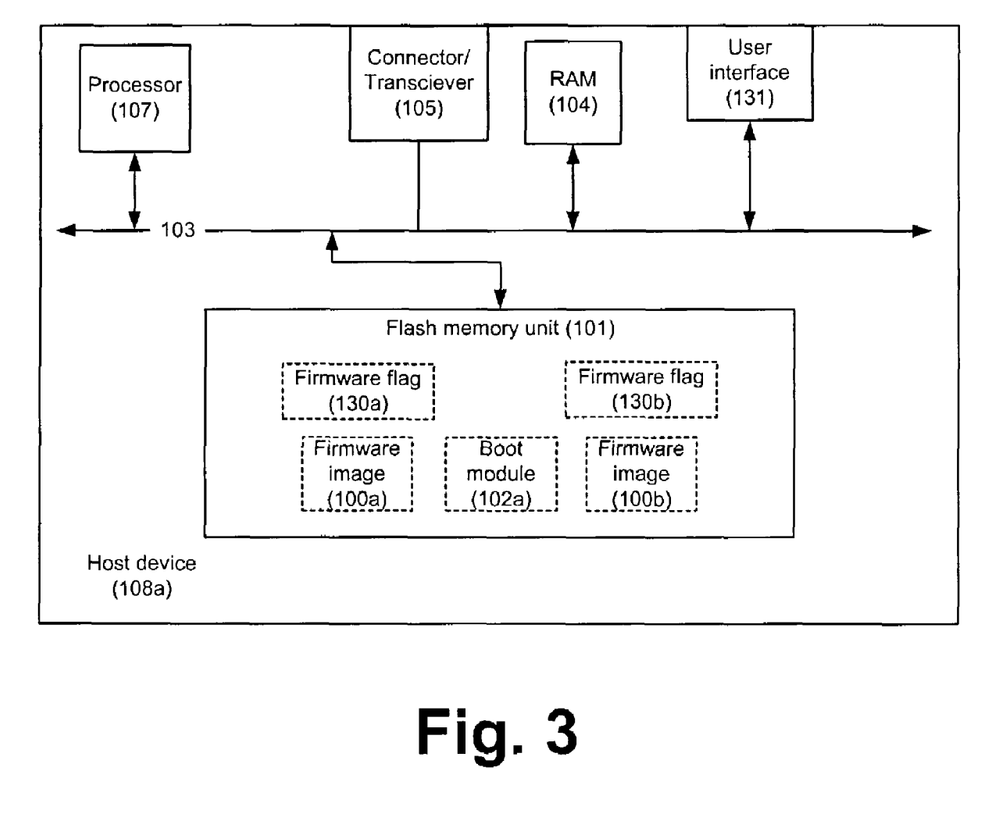
FIG. 3 is a block diagram of a second exemplary embodiment of a host device with available switching between two firmware images according to the principles of the present invention.

FIG. 3 is a block diagram of a second exemplary embodiment of a host device with available switching between two firmware images according to principles of the present invention. As shown in FIG. 3, the host device (108a) includes a non-volatile memory unit (101), preferably a flash memory unit. As before, this non-volatile memory unit (101) may be a single non-volatile memory device or may be a plurality of non-volatile memory devices.

The non-volatile memory unit (101) contains at least two firmware images (100a, 100b). A digital firmware flag (130a, 130b) is associated with each firmware image (100a, 100b). The purpose and operation of the firmware flag (130) will be described in more detail below.

If the non-volatile memory unit (101) consists of two or more non-volatile memory devices, each firmware image (100a, 100b) and its associated flag (130a, 130b) may be stored in a different non-volatile memory device. However, the two firmware images (100a, 100b) and associated flags (130a, 130b) can be stored at different locations within a single non-volatile memory device as shown in FIG. 3.

A boot code module (102a) is also preferably stored in the non-volatile memory unit (101) although it may be stored in a different non-volatile memory unit. As before, the boot code module (102a) contains the initial instructions for bringing the host device (108a) into operation, including identifying and loading an appropriate firmware image (e.g., 100a, 100b).

The host device (108a) also has a processor (107) and may have a RAM unit (104). As before, the processor (107) typically loads firmware into the RAM (104) and then executes the firmware. A data bus (103) interconnects the processor (107), RAM (104) and flash memory unit (101) so that data can be transmitted among the various components of the host device (108a). As before, the connector/transceiver (105) can connect to a variety of networks or devices with a wired or wireless data link.

As before, one image (100a) may be an older image, while the other image (100b) is an updated, newer firmware image (100b). Only one of the two firmware images (100a, 100b) will typically be loaded and executed at a time by the boot code (102a). However, with the two images resident in the host device (108) at the same time, switching between the two as needed is greatly simplified.

The boot code module (102a) determines which of the two firmware images (100a, 100b) should be used, e.g., loaded into RAM (104) and executed by the processor (107). Initially, the boot code module (102a) may seek to determine which of the two firmware images (100a, 100b) is the newest. As indicated above, this may be based on version number, date or order of download, etc. The presumption is that the newest version of firmware should be used.

However, before loading the newest version of firmware, the boot code (102a) will also read the firmware flags (130a, 130b) for both firmware images (100a, 100b). The flags (130a, 130b) indicate if a firmware version other than the newest version should be loaded.

Each flag (130a, 130b) is initially set to a hex value of 0xFFFF. In binary numbers, this value is represented by 16 consecutive 1's, i.e., 1111111111111111.

flash memory has the property of allowing the change of a bit from 1 to 0, but not from 0 to 1. Once a "0" is written to a location in flash memory, that entire block of the memory must be erased to change the "0" to a "1." Given this feature of flash memory, the 1's in the flags (130a, 130b) can be changed to 0's without erasing the data in the surrounding memory, i.e., in the memory block that contains the flag (130a, 130b).

When a new version of firmware (100b) is downloaded, one of the bits in the flag (130a) associated with the old version (100a) may be changed to a 0. For example, when the new version of firmware (100b) is downloaded, the old version (100a) will then be running on the host device (108a). The old version (100a) preferably includes in its code a routine that notes the receipt of a new firmware image (100b). Upon receipt of the new image (100b), the old image (100a) which is then running will change one of the bits of the firmware flag (130a) associated with the old image (100a) from a "1" to a "0."

When the host device (108a) is next booted, the boot code (102a) may, as indicated above, identify the latest version of the firmware. This can be done by looking at the firmware flags (130a, 130b). If one of the flags contains a "0" at a particular location, or if one contains a "0" and the other is all 1's, the boot code will recognize that the firmware (100a) associated with the flag (130a) containing the "0" is, by convention, the older version of the firmware. Consequently, the other firmware image (130b) will be loaded by the boot code (102a).

The other bits in the flags (130a, 130b) can be used to toggle between the firmware versions as needed. For example, a user interface (131) may be included in the host device (108a). The user interface (131) is connected to the data bus (103) and can thus provide data to the other components of the host device (108a). Instructions entered into the user interface (131) will be received by the then-running firmware. All the versions of firmware preferably include coding that allows receipt and implementation of a user command, entered with the user interface (131), to change one of the bits of a firmware flag (130a, 130b) from a "1" to a "0."

Thus, a scenario for toggling between firmware images might occur as follows. The user wishes to switch from a currently-running firmware image (100b) to an alternative firmware image (100a). The user enters an appropriate command through the user interface (131). The currently running firmware (100b) will then change a bit in one or both of the flags (130a, 130b) from a "1" to a "0." The change can be implemented in either or both flags (130a, 130b).

The device (108a) is then rebooted. The boot code module (102a) is loaded and executed. The boot code (102a) may determine the newest version of firmware, but will also preferably read the flags (130a, 130b). Depending on the pattern of 0's in the flags (130a, 130b), the boot code (102a) will load one of the firmware images (100a, 100b), not necessarily the newest. By altering the pattern of 1's and 0's in the flags (130a, 130b), the user can toggle between the two firmware images.

The exact set of rules for determining which firmware image to load based on the flags is subject to numerous variations. For example, the rule may be to load the firmware image associated with the flag that has the most 0's, or the fewest 0's. When all the bits in the flags (130a, 130b) have been changed to 0's the ability to toggle between firmware images may be lost, unless the flags and corresponding memory blocks are erased and reset. However, if a large enough memory block is reserved for the flag, one should be able to complete all testing before all the bits in the flag are cleared.

As with the embodiment illustrated in FIG. 1, a user or technician operating the user interface (131) can readily switch between firmware images (100a, 100b) on the host device (108a). As will be appreciated by those skilled in the art, this approach could also be extended to include three or more firmware images in flash memory, each having a firmware flag that indicates, upon inspection and subject to a set of rules, which firmware image is to be loaded and executed. As will be appreciated by those skilled in the art, the various steps of the method illustrated in FIG. 3, and similar methods according to principles of the present invention, could be performed in a different order than that given in FIG. 3.

Figure 4:
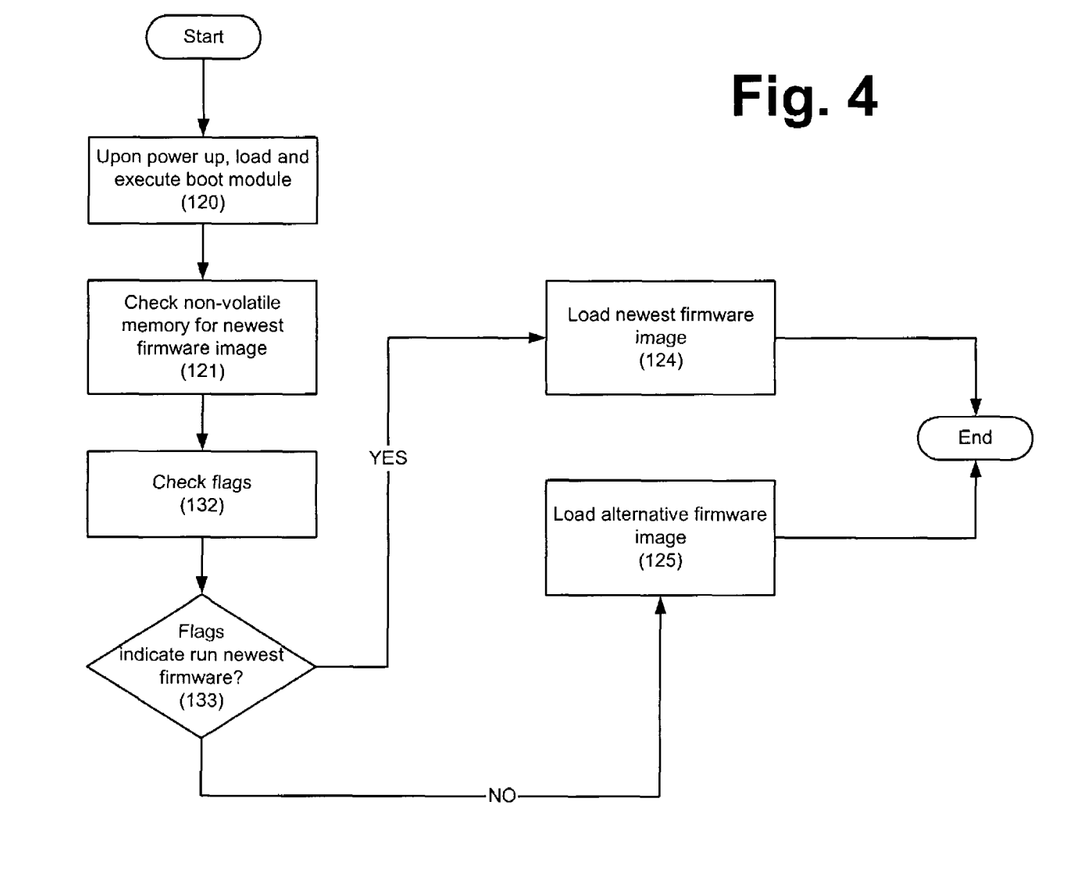
FIG. 4 is a flowchart illustrating an embodiment of a method of switching between alternative firmware images according to the principles of the present invention that is implemented, for example, in the device of FIG. 3.
Figure 5:
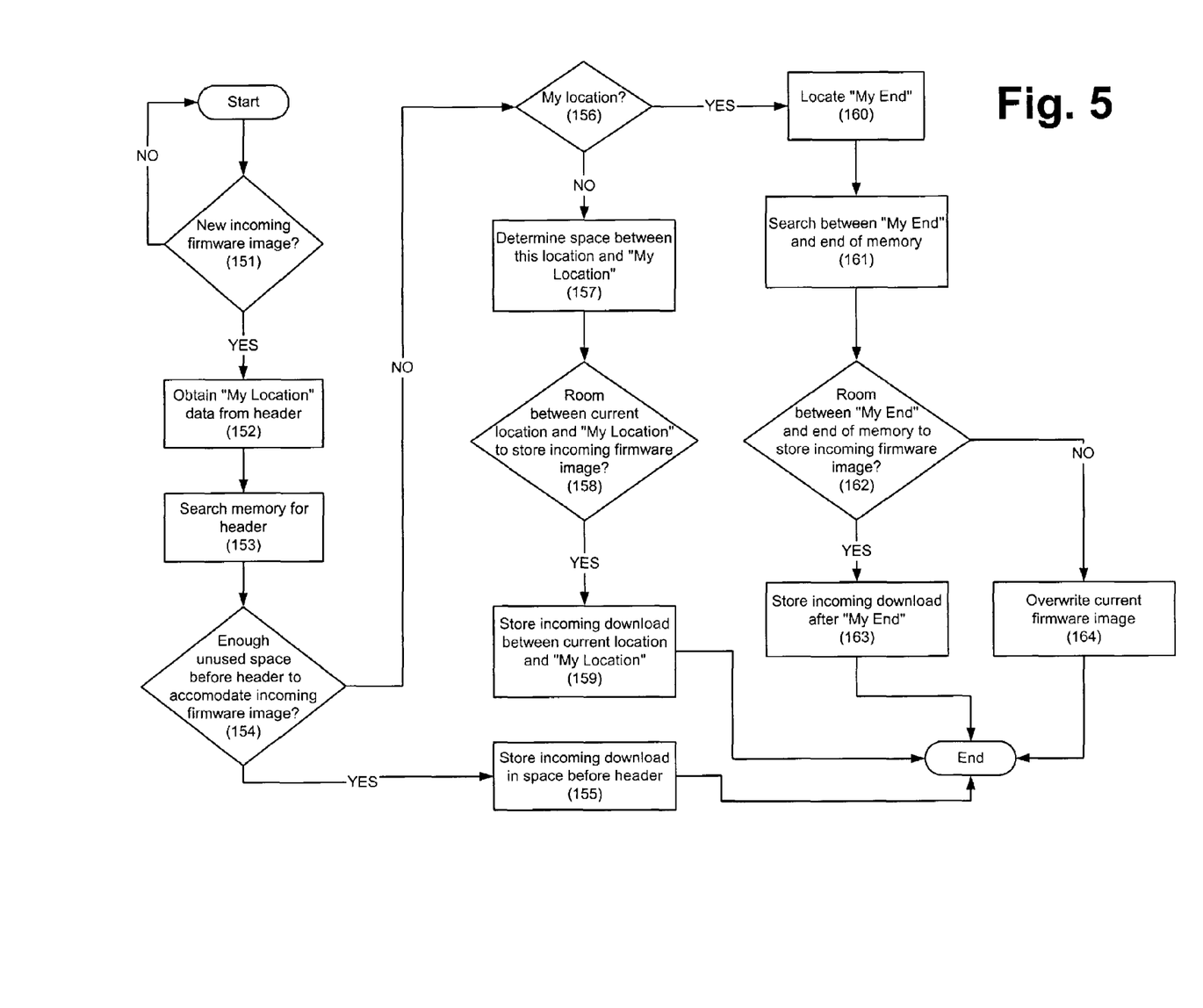
FIG. 5 is a flowchart which illustrates a method of determining the location of incoming firmware image.

FIG. 4 is a flowchart illustrating a method of switching between alternative firmware images according to principles of the present invention. The method illustrated in FIG. 4 can be implemented, for example, in the device of FIG. 3. As shown in FIG. 4, the method begins when the host device is powered up or booted. (step 120). At that time, the boot code module is loaded and executed. (step 120).

The boot code checks non-volatile memory to determine the number of firmware images available and which is the newest. (step 121). The boot code also checks the firmware flag associated with each firmware image. (step 132). As described above, the flags may indicate that the newest or an alternative firmware image is to be run according to a variety of possible rule sets. (decision 133).

If the flags indicate that the newest firmware image is to be run, the newest firmware image is loaded to RAM and executed. (step 124). Alternatively, the flags may indicate that the old image or an alternative firmware image is to be loaded and executed, in which case the older or alternative image is loaded and run. (step 125).

As will be appreciated by those skilled in the art, the various steps of the method illustrated in FIG. 4, and similar methods according to principles of the present invention, could be performed in a different order than that given in FIG. 4.

What is claimed is:

1. A method of switching between two or more images of firmware on a host device, said method comprising:
    storing two or more images of firmware in non-volatile memory of said host device; and
    loading one of said images upon startup in response to a user-controllable indicator comprising a plurality of digital flags, a separate flag being associated with each of said two or more images of firmware, each said flag having a plurality of possible states and selectively exhibiting one of said plurality of states, such that said plurality of digital flags, taken together, indicate which of said firmware images to load at startup;
    wherein said loading one of said images upon startup comprises reading the digital flag associated with each of said firmware images and loading a particular firmware image in accordance with said digital flags.

2. The method of claim 1, further comprising entering a command via a user interface to make a change to at least one of said flags.

3. The method of claim 1, wherein said loading one of said images further comprises copying a selected firmware image from non-volatile memory to random access memory.

4. The method of claim 1, further comprising executing a boot module stored in said non-volatile memory, wherein selection of a firmware image for execution is performed by said boot module.

5. The method of claim 1, wherein each of said flags comprises a binary string of 1's and 0's.

6. The method of claim 5, said method further comprising selecting a firmware image for loading based on which flag comprises the most 1's.

7. The method of claim 5, said method further comprising selecting a firmware image for loading based on which flag comprises the most 0's.

8. The method of claim 1, further comprising changing a single bit of one of said flags to select a different firmware image to be loaded at a subsequent startup.

9. A host device that runs firmware during operation, said host device comprising:
    a non-volatile memory unit that stores a boot code module and at least one firmware image;
    a processor for executing firmware that communicates with said non-volatile memory unit; and
    a plurality of digital flags such that a different digital flag is associated with each said firmware image in said non-volatile memory unit, each said flag having a plurality of possible states and selectively exhibiting one of said plurality of states;
    wherein said boot code module is configured to execute a particular firmware image in response to said digital flags.

10. The host device of claim 9, wherein said non-volatile memory unit comprises two or more memory devices.

11. The host device of claim 9, wherein each of said flags comprises a binary string of 1's and 0's.

12. The host device of claim 11, wherein said boot code module selects a firmware image for execution based on which flag comprises the most 1's.

13. The host device of claim 11, wherein said boot code module selects a firmware image for execution based on which flag comprises the most 0's.

14. A system for rapidly switching between two or more images of firmware on a host device, said system comprising:
- means for storing two or more images in said host device;
- means for indicating a particular image to load at startup comprising a separate digital flag associated with each said image for indicating which image to load at startup, each said flag having a plurality of possible states and selectively exhibiting one of said plurality of states; and
- means for loading one of said images upon startup in response to said means for indicating which a particular image to load at startup.

* * * * *

UNITED STATES PATENT AND TRADEMARK OFFICE
CERTIFICATE OF CORRECTION

| | | |
|---|---|---|
| PATENT NO. | : 7,080,245 B2 | Page 1 of 1 |
| APPLICATION NO. | : 10/155345 | |
| DATED | : July 18, 2006 | |
| INVENTOR(S) | : Curtis C. Ballard et al. | |

It is certified that error appears in the above-identified patent and that said Letters Patent is hereby corrected as shown below:

In column 10, line 6, in Claim 14, after "indicating" delete "which".

Signed and Sealed this

Fifth Day of May, 2009

JOHN DOLL
*Acting Director of the United States Patent and Trademark Office*